United States Patent [19]
Kanai et al.

[11] Patent Number: 4,672,496
[45] Date of Patent: Jun. 9, 1987

[54] MAGNETIC HEAD HAVING ELECTROMECHANICAL TRANSDUCER DISPOSED AT ONE END THEREOF

[75] Inventors: Kenji Kanai; Nobuyuki Kaminaka; Noboru Nomura; Yuuji Omata, all of Osaka, Japan

[73] Assignee: Matsushita Electric Industrial Co., Ltd., Osaka, Japan

[21] Appl. No.: 400,596

[22] Filed: Jul. 22, 1982

[30] Foreign Application Priority Data

Jul. 22, 1981 [JP] Japan ............................. 56-113753
Jul. 22, 1981 [JP] Japan ............................. 56-113754

[51] Int. Cl.⁴ .................................... G11B 5/147
[52] U.S. Cl. ......................... 360/126; 360/110; 360/123
[58] Field of Search ......................... 360/110–111, 360/123–127, 115, 113

[56] References Cited

U.S. PATENT DOCUMENTS

| | | | |
|---|---|---|---|
| 3,391,254 | 7/1968 | Honig | 360/115 |
| 4,097,802 | 6/1978 | Mahopac | 360/115 |
| 4,286,299 | 8/1981 | Shirahata et al. | 360/123 |
| 4,371,905 | 2/1983 | Valstyn et al. | 360/112 |
| 4,438,470 | 3/1984 | Sawada et al. | 360/126 |

OTHER PUBLICATIONS

IBM Tech. Disc. Bull., J. Flora et al, "Multitrack Probe Type Recording Transducer", vol. 3, No. 11, Apr. 1961, p. 18.

Primary Examiner—Stuart N. Hecker
Assistant Examiner—David J. Severin
Attorney, Agent, or Firm—Burgess, Ryan & Wayne

[57] ABSTRACT

A thin magnetic film is deposited over a nonmagnetic or piezoelectric substrate. When a shock wave is propagated through this substrate from its one end to the other end, the permeability of the thin magnetic film is locally increased and a portion or region having a high permeability also travels from one end to the other end of the thin magnetic film in unison with the shock wave. A magnetic core with a signal winding is disposed and magnetically coupled with the thin magnetic film. The signal can be recorded or reproduced while the recording medium is scanned.

12 Claims, 4 Drawing Figures

MAGNETIC HEAD HAVING ELECTROMECHANICAL TRANSDUCER DISPOSED AT ONE END THEREOF

BACKGROUND OF THE INVENTION

The present invention relates to a magnetic head especially adapted for recording and/or reading signals on a magnetic recording medium in the direction perpendicular to the direction in which the magnetic recording medium is transported.

One of the conventional magnetic heads of the type described is such that a plurality of magnetic head units or elements are arranged in a linear array in equidistantly spaced apart relationship in the direction perpendicular to the direction in which a magnetic recording medium such as a magnetic tape is transported relative to the magnetic head. In the recording mode with such a magnetic head, time-serial incoming signals are converted into parallel signals by a serial-to-parallel converter so that the parallel signals may be applied to respective magnetic head units or elements. In the reproduction mode, the parallel signals simultaneously derived from the magnetic head units or elements are converted by a parallel-to-serial converter into the serial signals. In order to increase the number of magnetic head units or elements per unit length in the lengthwise direction of the magnetic head; that is, the density of magnetic head units or elements, the magnetic head elements must be reduced in size as much as possible. However each of the magnetic head units or elements is mounted with a signal winding so that if they are reduced in size and accordingly increased in number, the number of lead wires extending from the signal windings increases accordingly. As a result, the overall yield of magnetic heads decreases with increase in the number of units or elements in each magnetic head.

SUMMARY OF THE INVENTION

One of the objects of the present invention is, therefore, to provide a magnetic head for recording and/or reading signals on a magnetic recording medium which has only one signal winding yet is capable of performing the same transverse recording/reproducing function as the magnetic heads with a plurality of units or elements.

Another object of the present invention is to provide magnetic heads which can be mass produced with higher yield.

When thin magnetic films are formed in the presence of a magnetic field by the vacuum evaporation or sputtering techniques which are widely used at present, the permeability in the hrd direction of magnetization becomes greater by for that in the easy direction. It is also well known that when a compressive or tensile force is exerted on the thin magnetic film in its easy direction, the permeability in the easy direction varies depending upon the magnitude of the applied force.

The present invention is based upon the above described properties of thin magnetic films. When a shock or impact is exerted on one end of a substrate upon which is formed a thin magnetic film in the manner described above, the shock wave propagates through the substrate from its one end to the other end. While the shock wave is traveling through the substrate, it applies a compressive or tensile force to a limited portion of the thin magnetic film so that this portion is mechanically distorted and consequently the permeability of this portion increase considerably. As a result, this portion or region can pass more lines of flux than other portions or regions not subjected to compressive or tensile force. This portion or region of increased permeability travels in unison with the shock wave.

According to the present invention, an auxiliary magnetic core with a signal winding is disposed in opposed relationship with the substrate coated with the thin magnetic film. A shock or impulse is applied to one end of the substrate simultaneous with the application of a control or signal current through the signal winding. Then, the portion or region with an enhanced or increased permeability propagates through the thin magnetic film in unison with the shock wave. This portion or region can pass more lines of flux as described previously. It follows, therefore, that if a magnetic recording medium such as a magnetic tape is moved relative to the substrate, the desired signals can be recorded on it. The process is reversed for reproduction. That is, the magnetic recording medium with the prerecorded signal is placed adjacent to the substrate with the thin magnetic film and a shock or impulse is imparted to one end of the substrate to cause the shock wave to propagate through the substrate or thin magnetic film as described above. Then, the output voltage representative of the signals recorded on the magnetic recording medium in the direction in which the shock wave propagates can be derived from the signal winding. To put in another way, as the shock wave scans the magnetic recording medium, the output voltage is induced through the signal winding.

From the foregoing description, it is apparent that the magnetic head in accordance with the present invention is simple in construction and needs a minimum number of component parts. As a consequence, the yield becomes considerably higher as compared with the prior art magnetic heads each comprising a plurality of units or elements arranged in a linear array as described above. It is well known that the overall yield can be given by the following formula:

$$\eta = p^n$$

where
P is the yield of units or elements; and
n is the number of units or elements in each magnetic head.

The above formula shows that the higher the number of units or elements, the more difficult it becomes to increase the overall yield $\eta$. According to the present invention, however, n is equal to 1 so that a high yield can be ensured. Furthermore, since the signals are recorded or reproduced through the signal winding, the number of terminals can be minimized. Furthermore, only one signal winding is employed, the electrical connection with associated devices can be much facilitated.

DESCRIPTION OF THE PREFERRED EMBODIMENTS

Figure 1:
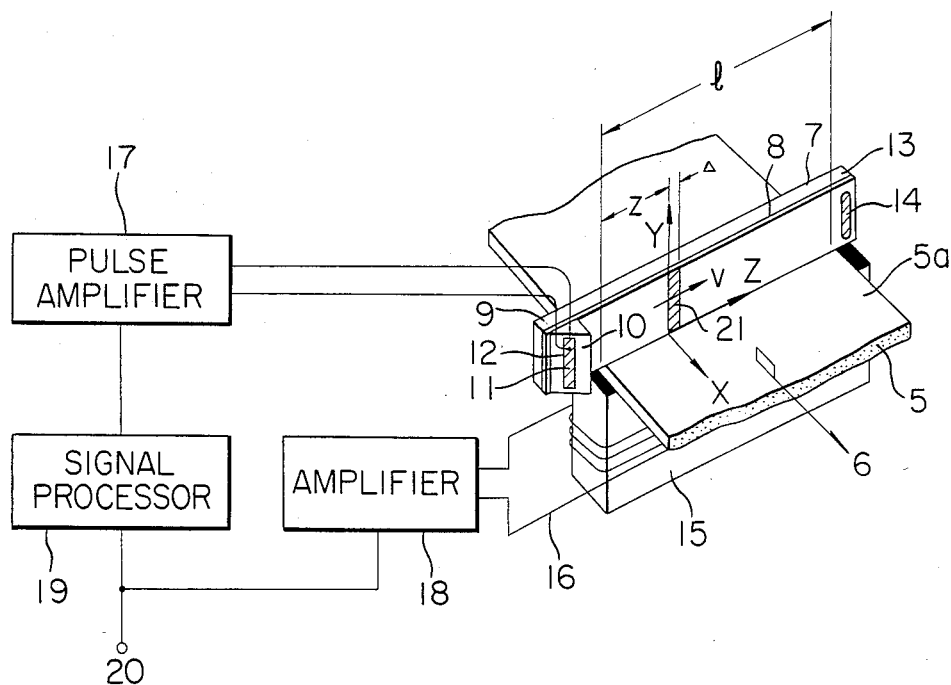
FIG. 1 is a perspective view of a first embodiment of the present invention.

As best shown in FIG. 1, according to the present invention, a rectangular thin magnetic film 8 which is made of a ferromagnetic material is deposited or otherwise formed over one major surface of a nonmagnetic substrate 7 in such a way that the longer or lengthwise sides of the thin magnetic film 8 may be in parallel with the surface of a magnetic recording medium $5_a$ and the shorter or widthwise sides thereof may be perpendicular to the surface of the recording medium $5_a$. An electromechanical transducer 11 is mounted on one shorter side 9 of the substrate 7 and a shock-wave attenuation or absorption element 14 is mounted on the other shorter side 13 thereof. The element 14 may be provided by depositing such a material as rubber, silicon rubber, epoxy resin or resin plastic which has a small value of mechanical Q. In order to record the signal on the recording medium $5a$, a coupling means which comprises a ferromagnetic auxiliary core 15 mounted with a signal winding 16 is disposed in opposite relationship with the thin magnetic film 8 across a recording medium 5.

More particularly, the electromechanical transducer 11 may be a piezoelectric transducer which may be mounted on the substrate 7 through a wedge-shaped mount 10. The piezoelectric transducer may be of the type comprising a crystal or ceramic material which has piezoelectric properties and which is mounted with a pair of electrodes. The rectangular thin magnetic film 8 is so deposited or formed that its direction of magnetization is parallel with its shorter sides.

For the sake of explanation, a Cartesian coordinate system is employed in which the X-axis extends in parallel with the direction of the transport of the recording medium 5 as indicated by an arrow 6; the Y-axis, in parallel with the shorter sides of the thin magnetic film 8; and the Z-axis, in parallel with the longer sides thereof.

In operation, a voltage supplied from a pulse amplifier 17 is applied between electrodes 12 of the transducer 11 and the shock waves produced by the transducer 11 are transmitted through the wedge-shaped mount 10 to the surface of the substrate 7. As a result, a mechanical deformed portion 21 with the width of Δ or a shock wave travels through the thin magnetic film 8 at the velocity of v and reaches the shock-wave attenuator or absorber 14 at the other shorter side of the substrate 7. The nonmagnetic substrate 7 may be made of a single crystal of saphire or silicon or glass.

An amplifier 18 is provided in order to apply signal currents to the winding 16 mounted on the auxiliary core 15. A signal processor 19 operates in synchronism with the recording signal applied to a terminal 20 so as to separate the components of the input signal to be applied to the pulse amplifier 17.

Figure 2:
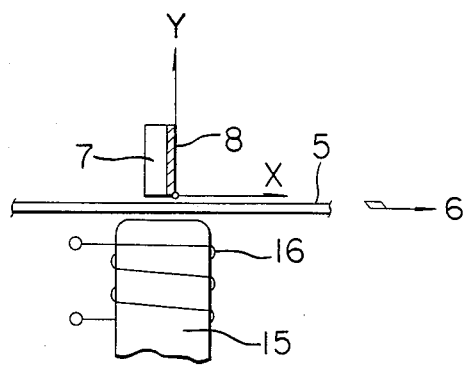
FIG. 2 is a fragmentary side view thereof.

The arrangement of components on the X-Y plane is best shown in FIG. 2. When the signal current flows through the winding 16 and the permeability $\mu$ in the direction of the Y-axis of the rectangular thin magnetic film 8 is high, the portion of the magnetic recording medium 5 immediately below the thin film 8 is magnetized. If the recording medium 5 is transported in the direction as indicated by the arrow 6, the signal is recorded time-sequentially. If the permeability of the thin magnetic film 8 is low, even if the signal current flows through the winding 16, no portion of the recording medium 5 is magnetized, so that no signal is recorded at all. It follows, therefore, that the input signal is recorded on the recording medium 5 immediately below the mechanically deformed or high-permeability portion 21 at a distance z from an edge of the recording medium 5 and which travels throughout the length l of the thin film 8 in the direction Z at the velocity v.

Figure 3:
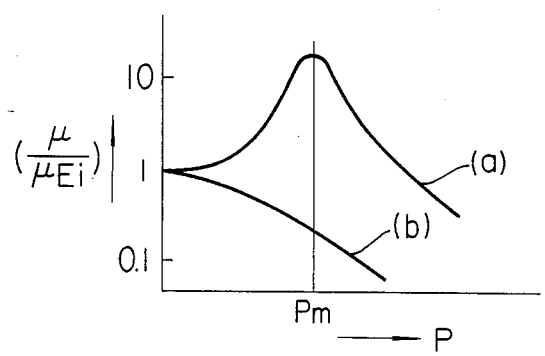
FIG. 3 is a graph illustrating the variations in permeability in response to the force applied to the thin magnetic film thereof.

The thin magnetic film 8 may be formed upon the substrate 7 by the vacuum deposition or electroplating of, for instance, a Ni-Fe alloy at the presence of magnetic fields. If the orientation of the thin magnetic film is carefully controlled, the ratio $\mu_{Hi}/\mu_{Ei}$ can exceed 10, where $\mu_{Hi}$ is the permeability in the hard axis or direction of magnetization while $\mu_{Ei}$ is the permeability in the easy direction. If the thin magnetic film 8 has a positive constant of magnetostriction and if a compressive force is exerted in the easy direction, the permeability $\mu_{Ei}$ increases, but if a tensile force is applied, the permeability decreases. Furthermore, if the thin film 8 has a negative constant of magnetostriction, a compressive force applied thereto decreases the permeability while the tensile force increases the permeability. These phenomena are graphically illustrated in FIG. 3. The characteristic curve (a) in FIG. 3 shows the relationship between the compressive force P applied to a thin magnetic film with a positive constant of magnetostriction and the ratio $\mu/\mu_{Ei}$. It is seen that the ratio $\mu/\mu_{Ei}$ becomes maximum at Pm. On the other hand, when the tensile force is applied, the ratio $\mu/\mu_{Ei}$ drops as indicated by the curve (b). Based on these phenomena, the regions (to be referred to as "the recordable regions") in which data can be recorded can be selected along the length l of the recording medium 5. As described previously, the shock wave produced by the transducer 11 travels through the thin magnetic film 8 at the velocity v so that the recordable region also travels at the velocity v through the length l. Therefore, the recording head of the present invention which is very simple in construction as shown in FIG. 1 can operate in a manner substantially similar to that of the conventional multi-element magnetic heads.

Figure 4:
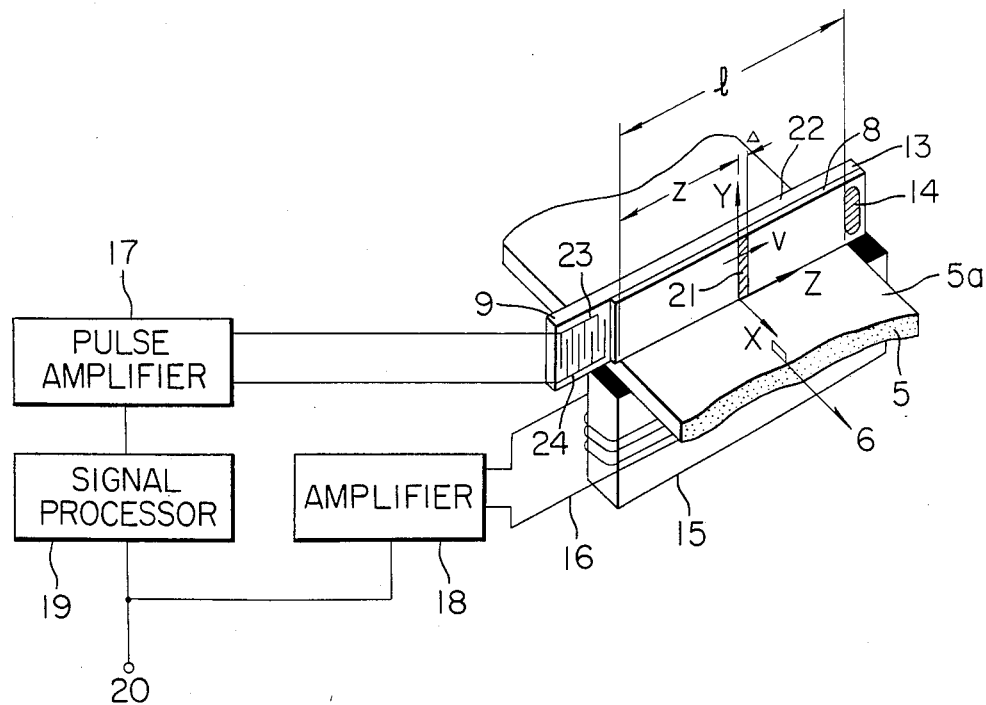
FIG. 4 is a perspective view of a second embodiment of the present invention.

A second embodiment of the present invention is shown in FIG. 4. As in the first embodiment, a rectangular thin magnetic film 8 is deposited or otherwise formed over one surface of a nonmagnetic substrate 22 which has piezoelectric properties. The longer or lengthwise sides of the thin film 8 are in parallel with the surface of the recording medium $5_a$ and the shorter or widthwise sides thereof are perpendicular to the surface of the medium $5_a$. A comb-shaped or interdigital electrode pattern comprising electrodes 23 and 24 is formed at one end 9 of the substrate 22 and a shock-wave attenuator or absorber 14 is disposed at the other end 13 thereof. The adjacent digits of said interdigital electrode structure are equidistantly spaced apart from each other by a predetermined distance and are applied with an isolated pulse voltage. Other arrangements are substantially similar to those of the first embodiment shown in FIG. 1.

In operation, discrete voltage pulses are applied from the pulse amplifier 17 to the interdigital electrode structure; that is, between the electrodes 23 and 24 so that the shock waves propagate over the surface of the substrate 22 which is made of a piezoelectric material. In other words, as already explained hereinbefore, the mechanically deformed portion 21 with the width Δ travels through the rectangular thin magnetic film 8 at the velocity v in the Z direction and reaches the shock-wave attenuator or absorber 14. Therefore, as with the first embodiment, the recordable regions can be arbitrarily selected over the length l of the recording medium 5.

In summary, according to the present invention elastic energy can be applied to the substrate with high efficiency and can be converted into the shock wave or portion or region with an enhanced permeability traveling through the thin magnetic film at a predetermined velocity. Therefore, the scanning type magnetic head of the present invention is very simple in construction yet highly reliable and efficient in operation.

What is claimed is:

1. A magnetic head for recording information on a recording medium comprising:
    an elongated substrate made of a piezoelectric material and having at least one substantially planar major surface having an edge in close uniform proximity to one side of said recording medium, thereby mitigating attenuation problems;
    electromechanical transducer means disposed at one end of one major surface of said substrate;
    a thin magnetic film formed upon said one major surface of said substrate;
    signal winding means provided on the opposite side of said recording medium for magnetically coupling with said thin magnetic film; and
    means for controlling said electromechanical transducer means to produce shock waves through said substrate.

2. A magnetic head for recording information on a recording medium comprising:
    an elongated substrate made of a nonmagnetic material and having at least one substantially planar major surface having an edge in close uniform proximity to one side of said recording medium, thereby mitigating attenuation problems;
    electromechanical transducer means disposed at one end of one major surface of said substrate;
    a thin magnetic film formed over said one major surface of said substrate;
    signal winding means provided on the opposite side of said recording medium for magnetically coupling with said thin magnetic film; and
    means for controlling said electromechanical transducer means to produce shock waves through said substrate.

3. A magnetic head as set forth in claim 2 wherein said substrate is made of glass.

4. A magnetic head as set forth in claim 2 wherein said substrate is made of a single-crystal material.

5. A magnetic head comprising:
    an elongated piezoelectric substrate having at least one major surface;
    an interdigital electrode structure disposed at one end of one major surface of said piezoelectric substrate, said one major surface having its longitudinal axis arranged along the widthwise direction of a recording medium;
    a thin magnetic film formed over said one major surface of said substrate;
    signal winding means provided for magnetically coupling the said thin magnetic film; and
    means for controlling said interdigital electrode structure to produce shock waves through said substrate.

6. A magnetic head as set forth in claim 5 wherein the adjacent digits of said interdigital electrode structure are equidistantly spaced apart from each other by a predetermined distance and are applied with an isolated pulse voltage from said means for controlling.

7. A magnetic head comprising:
    (a) an elongated substrate made of a piezoelectric material, and having at least one major surface;
    (b) a rectangular thin magnetic film formed over one major surface of said substrate;
    (c) electromechanical transducer means disposed at one end of one major surface of said substrate;
    (d) attenuator means disposed at the other end of said substrate for attenuating waves propagated through said substrate,
    (e) a magnetic core with a signal winding which is disposed adjacent to said thin magnetic film, and
    (f) means for controlling said transducer means to produce shock waves through said substrate.

8. A magnetic head comprising:
    (a) an elongated substrate made of a piezoelectric material, and having at least one major surface;
    (b) a rectangular thin magnetic film formed over one major surface of said substrate,
    (c) electromechanical transducer means disposed at one end of one major surface of said substrate;
    (d) attenuator means disposed at the other end of said substrate for attenuating and/or absorbing waves propagated through said substrate,
    (e) magnetic core means with a signal winding which is disposed adjacent to said thin magentic film,
    (f) a passage for a recording medium defined between said substrate and said magnetic core means, and
    (g) means for controlling said transducer means to produce shock waves through said substrate.

9. A magnetic head comprising:
    (a) an elongate substrate made of a piezoelectric material, and having at least one major surface;
    (b) a rectangular thin magnetic film formed over one major surface of said substrate in such a way that its easy axis of magnetization is perpendicular to the surface of a magnetic recording medium,
    (c) electromechanical transducer means disposed at one end of said substrate,
    (d) signal winding means disposed adjacent to said rectangular thin magnetic film, and
    (e) means for controlling said transducer means to produce shock waves through said substrate.

10. A magnetic head comprising:
    (a) an elongated substrate made of a nonmagnetic material having at least one major surface;
    (b) a rectangular thin magnetic film formed over one major surface of said substrate,
    (c) electromechanical transducer means disposed at one end of one major surface of said substrate;
    (d) attenuator means disposed at the other end of said substrate for attenuating waves propagated through said substrate,
    (e) a magnetic core with a signal winding which is disposed adjacent to said thin magnetic film, and
    (f) means for controlling said transducer means to produce shock waves through said substrate.

11. A magnetic head comprising:
    (a) an elongated substrate made of a nonmagnetic material, and having at least one major surface;
    (b) a rectangular thin magnetic film formed over one major surface of said substrate,
    (c) electromechanical transducer means disposed at one end of one major surface of said substrate;

(d) attenuator means disposed at the other end of said substrate for attenuating and/or absorbing waves propaged through said substrate,
(e) magnetic core means with a signal winding which is disposed adjacent to said thin magnetic film,
(f) a passage for a recording medium defined between said substrate and said magnetic core means, and
(g) means for controlling said transducer means to produce shock waves through said substrate.

12. A magnetic head comprising:
(a) an elongted substrate made of a nonmagnetic material, and having at least one major surface;
(b) a rectangular thin magnetic film formed over one major surface of said substrate in such a way that its easy axis of magnetization is perpendicular to the surface of a magnetic recording medium,
(c) electromechanical transducer means disposed at one end of said substrate,
(d) signal winding means disposed adjacent to said rectangular thin magnetic film, and
(e) means for controlling said transducer means to produce shock waves through said substrate.

* * * * *